US008170766B2

(12) United States Patent
Kim et al.

(10) Patent No.: US 8,170,766 B2
(45) Date of Patent: May 1, 2012

(54) SYSTEM AND METHOD FOR SUPPLYING POWER TO ABS FOR VEHICLE

(75) Inventors: Jong Wan Kim, Suwon (KR); Se Min Oh, Suwon (KR)

(73) Assignee: Hyundai Motor Company, Seoul (KR)

( * ) Notice: Subject to any disclaimer, the term of this patent is extended or adjusted under 35 U.S.C. 154(b) by 1058 days.

(21) Appl. No.: 12/082,200

(22) Filed: Apr. 8, 2008

(65) Prior Publication Data

US 2009/0118959 A1 May 7, 2009

(30) Foreign Application Priority Data

Nov. 7, 2007 (KR) ........................ 10-2007-0113308

(51) Int. Cl.
*B60B 39/00* (2006.01)
(52) U.S. Cl. ............................ 701/71; 320/116; 701/70
(58) Field of Classification Search .................... 701/70, 701/71; 320/116, 137
See application file for complete search history.

(56) References Cited

U.S. PATENT DOCUMENTS

| | | | | |
|---|---|---|---|---|
| 4,604,528 A | * | 8/1986 | Norton | 307/9.1 |
| 4,816,736 A | * | 3/1989 | Dougherty et al. | 320/116 |
| 4,963,813 A | * | 10/1990 | Bolle | 320/116 |
| 5,164,655 A | * | 11/1992 | Heavey | 322/8 |
| 5,588,719 A | * | 12/1996 | Bailleux | 303/122.04 |
| 5,717,310 A | * | 2/1998 | Sakai et al. | 307/10.1 |
| 6,057,669 A | * | 5/2000 | Lai et al. | 320/116 |
| 6,218,643 B1 | * | 4/2001 | Iwata et al. | 219/202 |
| 6,668,225 B2 | * | 12/2003 | Oh et al. | 701/70 |
| 6,862,504 B2 | * | 3/2005 | Hamdan et al. | 701/29 |
| 6,982,499 B1 | * | 1/2006 | Kachi et al. | 307/75 |
| 7,352,154 B2 | * | 4/2008 | Cook | 320/116 |
| 7,638,974 B2 | * | 12/2009 | Maleus | 320/119 |
| 7,808,208 B2 | * | 10/2010 | Choi | 320/119 |
| 2002/0095251 A1 | * | 7/2002 | Oh et al. | 701/70 |
| 2002/0097027 A1 | * | 7/2002 | Asao et al. | 322/28 |
| 2002/0149954 A1 | * | 10/2002 | Besnier et al. | 363/123 |
| 2003/0151386 A1 | * | 8/2003 | Godefroy | 320/103 |
| 2004/0049361 A1 | * | 3/2004 | Hamdan et al. | 702/115 |
| 2004/0113586 A1 | * | 6/2004 | Chen | 320/118 |
| 2005/0001496 A1 | * | 1/2005 | Bailey | 310/100 |
| 2006/0012347 A1 | * | 1/2006 | Breen | 323/234 |
| 2008/0006584 A1 | * | 1/2008 | Van Vliet et al. | 210/748 |
| 2008/0050645 A1 | * | 2/2008 | Kai et al. | 429/61 |
| 2008/0193832 A1 | * | 8/2008 | Doffin et al. | 429/122 |
| 2009/0021220 A1 | * | 1/2009 | Choi | 320/137 |
| 2009/0107743 A1 | * | 4/2009 | Alston et al. | 180/65.21 |
| 2009/0115377 A1 | * | 5/2009 | Schwenke et al. | 320/162 |
| 2010/0141209 A1 | * | 6/2010 | Shiu et al. | 320/120 |
| 2011/0162141 A1 | * | 7/2011 | Lemire et al. | 5/510 |

* cited by examiner

*Primary Examiner* — Helal A Algahaim
(74) *Attorney, Agent, or Firm* — Edwards Wildman Palmer LLP; Peter F. Corless

(57) ABSTRACT

A system and method for supplying power to an Anti-lock Braking System (ABS) for a vehicle includes: determining whether an ignition key has been turned on; comparing voltage of a first battery unit, configured to apply the power to an ABS actuation unit, with voltage of a second battery unit, connected to the first battery unit, if the ignition key has been turned on; determining whether the ABS actuation unit is operating if the voltage of the first battery unit is lower than the voltage of the second battery unit; and charging the first battery unit with the power if the ABS actuation unit is operating, and balancing the voltage of the first battery unit and the voltage of the second battery unit if the ABS actuation unit is not operating.

4 Claims, 3 Drawing Sheets

SYSTEM AND METHOD FOR SUPPLYING POWER TO ABS FOR VEHICLE

CROSS-REFERENCE TO RELATED APPLICATIONS

This application claims priority to Korean Application No. 10-2007-0113308, filed on Nov. 7, 2007, the disclosure of which is incorporated herein by reference.

BACKGROUND

1. Technical Field

The present invention relates to a system and method for supplying power to an Anti-lock Braking System (ABS) for a vehicle.

2. Background Art

ABSs, which ensures an appropriate cornering force thereby not only maintaining steering capability but also acquiring large friction coefficient values, are widely used for vehicles.

Meanwhile, in the case where 12 volt ABSs are applied to vehicles that use 24 volt electrical or electronic parts, such as the commercial vehicles Mighty™ and County™, the 24 volt electrical or electronic parts must be replaced with 12 volt parts, which is difficult to realize.

To solve the above problem, a technology using a Direct Current (DC/DC) converter for converting voltage in a vehicle to which a 12 volt ABS is applied has been proposed. For example, as shown in FIG. 1, in the case where a 12 volt ABS is applied to a vehicle using a 24 volt alternator 10, a DC/DC converter 20 for converting a voltage of 24 V into a voltage of 12 V and supplying power to an ABS motor 40 and a small-sized 12 volt battery 30 are additionally used.

Meanwhile, to implement this, a new DC/DC converter must be developed, and an electrical circuit to which an auxiliary battery is added must be constructed, which cause disadvantages from the aspects of weight and the difficulty of installation of a product.

The information disclosed in this Background section is only for enhancement of understanding of the background of the invention and should not be taken as an acknowledgement or any form of suggestion that this information forms the prior art that is already known to a person skilled in the art.

SUMMARY OF THE DISCLOSURE

Accordingly, the present invention has been made keeping in mind the above problems occurring in the prior art, and an object of the present invention is to provide a system and method for supplying power to an ABS for a vehicle, which enables a 12 volt ABS to be applied to a vehicle that uses 24 volt electrical or electronic parts.

In one aspect, the present invention provides a method of dividing 24 volt power of an alternator into 12 volt power and supplying the power to an Anti-lock Braking System (ABS) for a vehicle. Preferably, the method includes: determining whether an ignition key has been turned on; comparing voltage of a first battery unit, configured to apply the power to an ABS actuation unit, with voltage of a second battery unit, connected to the first battery unit, if the ignition key has been turned on; determining whether the ABS actuation unit is operating if the voltage of the first battery unit is lower than the voltage of the second battery unit; and charging the first battery unit with the power if the ABS actuation unit is operating, and balancing the voltage of the first battery unit and the voltage of the second battery unit if the ABS actuation unit is not operating.

Suitably, the method may further include, after comparing the voltage of the first battery unit with the voltage of the second battery unit, switching to a standby mode if the voltage of the first battery unit is equal to or higher than the voltage of the second battery unit.

In another aspect, the present invention provides a system for supplying power to an ABS for a vehicle, the system including: an ABS actuation unit for actuating the ABS; an alternator for receiving driving force from an engine and generating Alternating Current (AC) power, a distribution control unit receiving 24 volt power from the alternator; a first battery unit electrically connected to the distribution control unit and configured to supply 12 volt power to the ABS actuation unit and a second battery unit electrically connected to the first battery unit so that voltage of the second battery unit can be balanced with voltage of the first battery unit.

Suitably, the distribution control unit may compare a voltage of the first battery unit with a voltage of the second battery unit if an ignition key has been turned on, determine whether the ABS actuation unit is operating if the voltage of the first battery unit is lower than the voltage of the second battery unit, charge the first battery unit with power if the ABS actuation unit is operating, and balance the voltage of the first battery unit and the voltage of the second battery unit if the ABS actuation unit is not operating.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
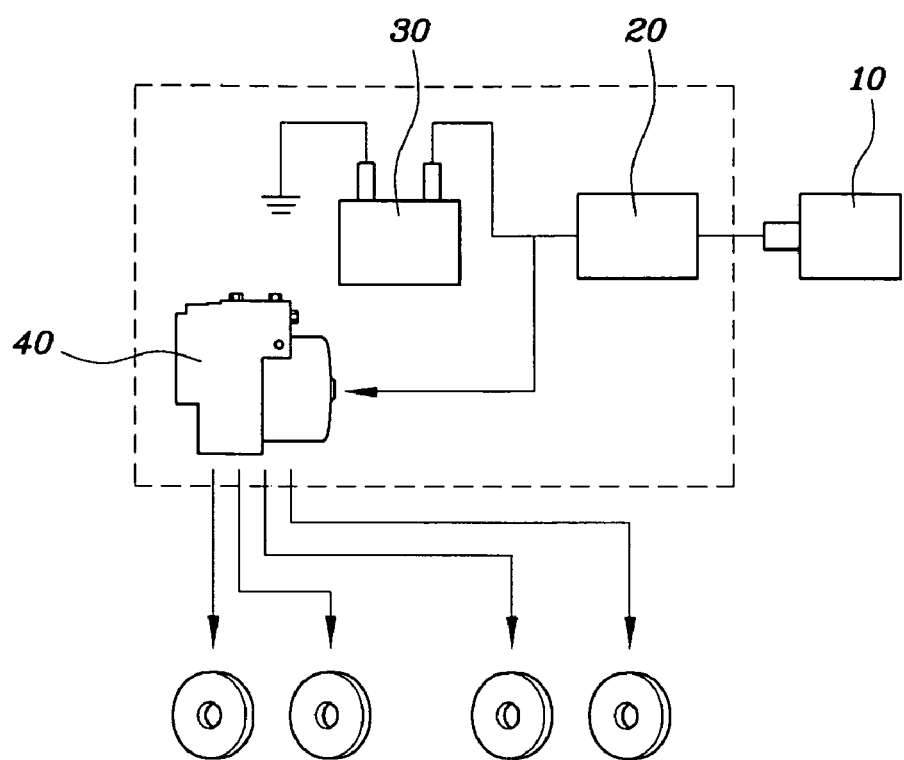
FIG. 1 is a diagram showing the construction of a prior art system for supplying power to an ABS for a vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 2:
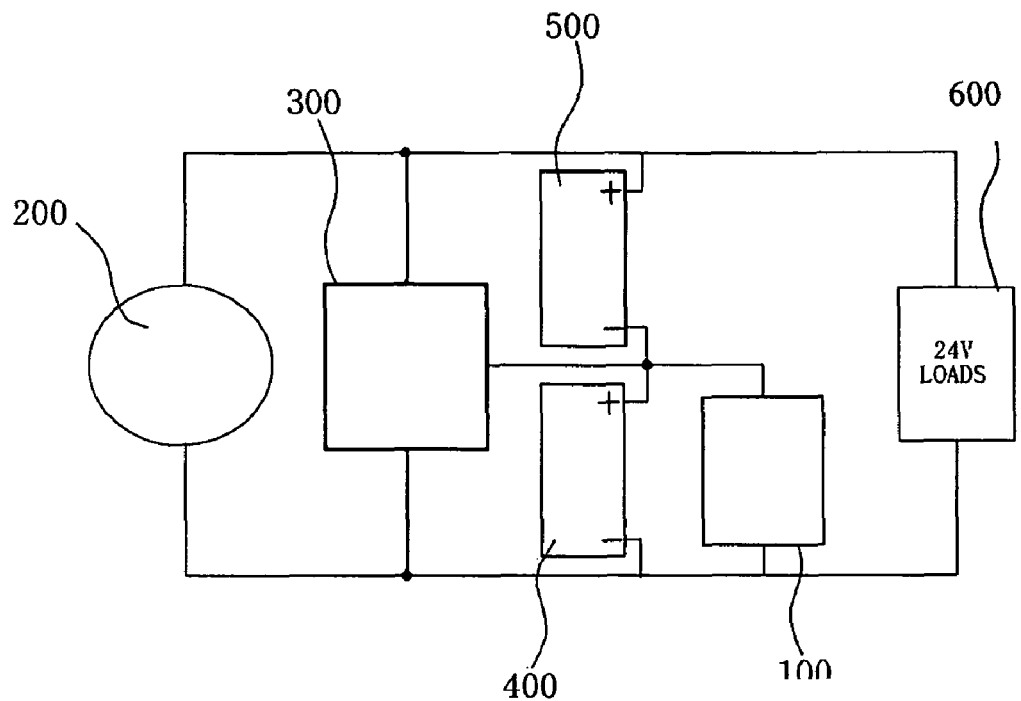
FIG. 2 is a diagram showing the construction of a system for supplying power to an ABS for a vehicle according to a preferred embodiment of the present invention.

As shown in FIG. 2, a system for supplying power to an ABS for a vehicle according to a preferred embodiment of the present invention includes an ABS actuation unit 100, an alternator 200 for receiving driving force from an engine and generating 24 volt alternating current power, a distribution control unit 300 for distributing 24 volt power from the alternator 200, a first battery unit 400 electrically connected to a distribution control unit 300, and a second battery unit 500 electrically connected in series to the first battery unit 400. In this case, 24 volt loads 600, such as the headlight, wiper and Electronic Control Unit (ECU) of the vehicle, are connected in parallel to each other, and are electrically connected to the alternator 200.

In detail, the ABS actuation unit 100 is used to improve the stability of steering of a vehicle, and functions to receive 12 volt power from the first battery unit 400 and actuate the ABS using the 12 volt power.

In the present embodiment, a 12 volt ABS motor is used in the ABS actuation unit 100. Since the construction of the 12 volt ABS motor is the same as that of a prior art ABS motor, which is used to operate a prior art ABS, a detailed description thereof is omitted here.

The first battery unit 400, which is configured to supply 12 volt power to the ABS actuation unit 100, receives power from the distribution control unit 300 while the ABS actuation unit 100 operates. The first battery unit 400 is electrically connected in series to the second battery unit 500, and can be charged with power through a balancing operation, as described below, in conjunction with the second battery unit 500 while the ABS actuation unit 100 is not operating.

The distribution control unit 300 is electrically connected in parallel to and receives 24 volt power from the alternator 200, and selectively distributes relevant power to the first battery unit 400 and the second battery unit 500.

That is, when an ignition key is operated, the distribution control unit 300 compares the voltage of the first battery unit 400 with the voltage of the second battery unit 500. The distribution control unit 300 determines whether the ABS actuation unit 100 is operating if the voltage of the first battery unit 400 is lower than the voltage of the second battery unit 50, and maintains a standby mode if the voltage of the first battery unit 400 is equal to or higher than the voltage of the second battery unit 500.

If the voltage V1 of the first battery unit 400 is lower than the voltage V2 of the second battery unit 500, the distribution control unit 300 supplies power to the first battery unit 400 and then charges the first battery unit 400 with the power if the ABS actuation unit 100 is operating, and balances the voltage of the first battery unit 400 and the voltage of the second battery unit 500 if the ABS actuation unit 100 is not operating. By doing so, the distribution control unit 300 enables the voltage of the first battery unit 400 and the voltage of the second battery unit 500 to be balanced.

As a result, the present invention has an advantage in that no additional auxiliary battery is required because an existing 24 volt battery, composed of two 12 volt batteries, is used. Furthermore, the present invention is capable of approximately doubling the lifespan of a battery by frequently balancing the first battery unit 400 and the second battery unit 500.

Figure 3:
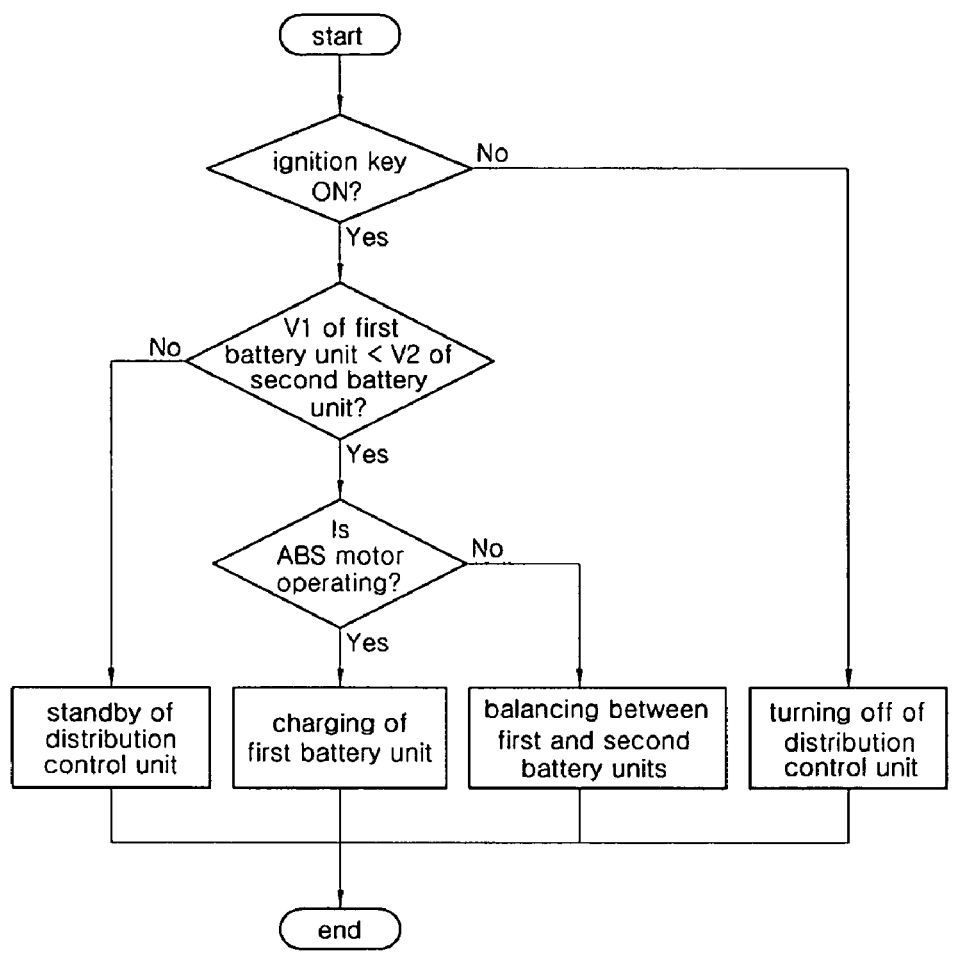
FIG. 3 is a block diagram showing a method of supplying power to an ABS for a vehicle according to a preferred embodiment of the present invention.

In another aspect, the present invention provides a method of supplying power to an ABS for a vehicle. As shown in FIG. 3, according to a preferred embodiment of the present invention, it is first determined whether the ignition key has been turned on, and the voltage of the first battery unit is compared with the voltage of the second battery unit if the ignition key has been turned on.

In this case, it is determined whether the ABS actuation unit is operating if the voltage V1 of the first battery unit is lower than the voltage V2 of the second battery unit, and a standby mode is maintained if the voltage v1 of the first battery unit is equal to or higher than the voltage V2 of the second battery unit.

Thereafter, the first battery unit is charged with power if the ABS actuation unit is operating, and the voltage of the first battery unit and the voltage of the second battery unit are balanced if the ABS actuation unit is not operating.

For example, generally, when the ignition key has been turned on, a voltage of 27 V is applied to the distribution control unit. In this case, each of the first and second battery units is charged with a voltage of 13.5 V, which is half of a voltage of 27 V. When the voltage of the first battery unit is decreased by the operation of the ABS actuation unit, the first battery unit can be balanced with the second battery unit.

According to the present invention, there is an economic advantage in that the cost of the development of electrical or electronic parts suitable for a 12 volt ABS can be eliminated because the 12 volt ABS can be applied to a vehicle that uses 24 volt electrical or electronic parts.

Furthermore, the present invention has an advantage in that the durability of a product can be improved by increasing the lifespan of a battery through voltage balancing between two batteries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of dividing 24 volt power of an alternator into 12 volt power and supplying the power to an Anti-lock Braking System (ABS) for a vehicle, the method comprising:
   receiving, by the distribution control unit, 24V from an alternator electrically connected to the distribution control unit;
   determining whether an ignition key has been turned on by the distribution control unit;
   in response to determining that the ignition key has been turned on, comparing, by the distribution control unit, voltage of a first battery unit, configured to apply 12 volt power to an ABS actuation unit, with voltage of a second battery unit, connected to the first battery unit;
   determining, by the distribution control unit, whether the ABS actuation unit is operating when the voltage of the first battery unit is lower than the voltage of the second battery unit; and
   charging the first battery unit with power from the distribution control unit when the ABS actuation unit is operating, and balancing the voltage of the first battery unit and the voltage of the second battery unit when the ABS actuation unit is not operating.

2. The method as set forth in claim 1, further comprising, after comparing the voltage of the first battery unit with the voltage of the second battery unit, switching to a standby mode when the voltage of the first battery unit is equal to or greater than the voltage of the second battery unit.

3. A system for supplying power to an ABS for a vehicle, comprising:
   an ABS actuation unit configured to actuate the ABS;
   an alternator configured to receive driving force from an engine and generate Alternating Current (AC) power;
   a distribution control unit electrically connected with the alternator and configured to receive 24 volt power from the alternator;

a first battery unit electrically connected to the distribution control unit and configured to supply 12 volt power to the ABS actuation unit;

a second battery unit electrically connected to the first battery unit so that voltage of the second battery unit is balanced with voltage of the first battery unit, and wherein the distribution control unit compares the voltage of the first battery unit with the voltage of the second battery unit when an ignition key has been turned on, determines whether the ABS actuation unit is operating when the voltage of the first battery unit is lower than the voltage of the second battery unit, charges the first battery unit with power when the ABS actuation unit is operating, and balances the voltage of the first battery unit and the voltage of the second battery unit when the ABS actuation unit is not operating.

4. A circuit, comprising:

an ABS actuation unit configured to actuate the ABS;

an alternator configured to receive a driving force from an engine and generate Alternating Current (AC) power;

a distribution control unit electrically connected in parallel with the alternator and configured to receive 24 volt power from the alternator;

a first battery unit electrically connected to the distribution control unit and configured to supply 12 volt power to the ABS actuation unit; and a second battery unit electrically connected to the first battery unit so that voltage of the second battery unit is balanced with voltage of the first battery unit wherein the distribution control unit is further configured to compare the voltage of the first battery unit with the voltage of the second battery unit in response to a determination that an ignition key has been turned on, determine whether the ABS actuation unit is operating when the voltage of the first battery unit is lower than the voltage of the second battery unit, and charge the first battery unit with power from the distribution control unit when the ABS actuation unit is operating, and balance the voltage of the first battery unit and the voltage of the second battery unit when the ABS actuation unit is not operating.

\* \* \* \* \*